Dec. 30, 1941.   O. S. PETTY   2,268,495
SUSPENSION SYSTEM
Filed May 1, 1940
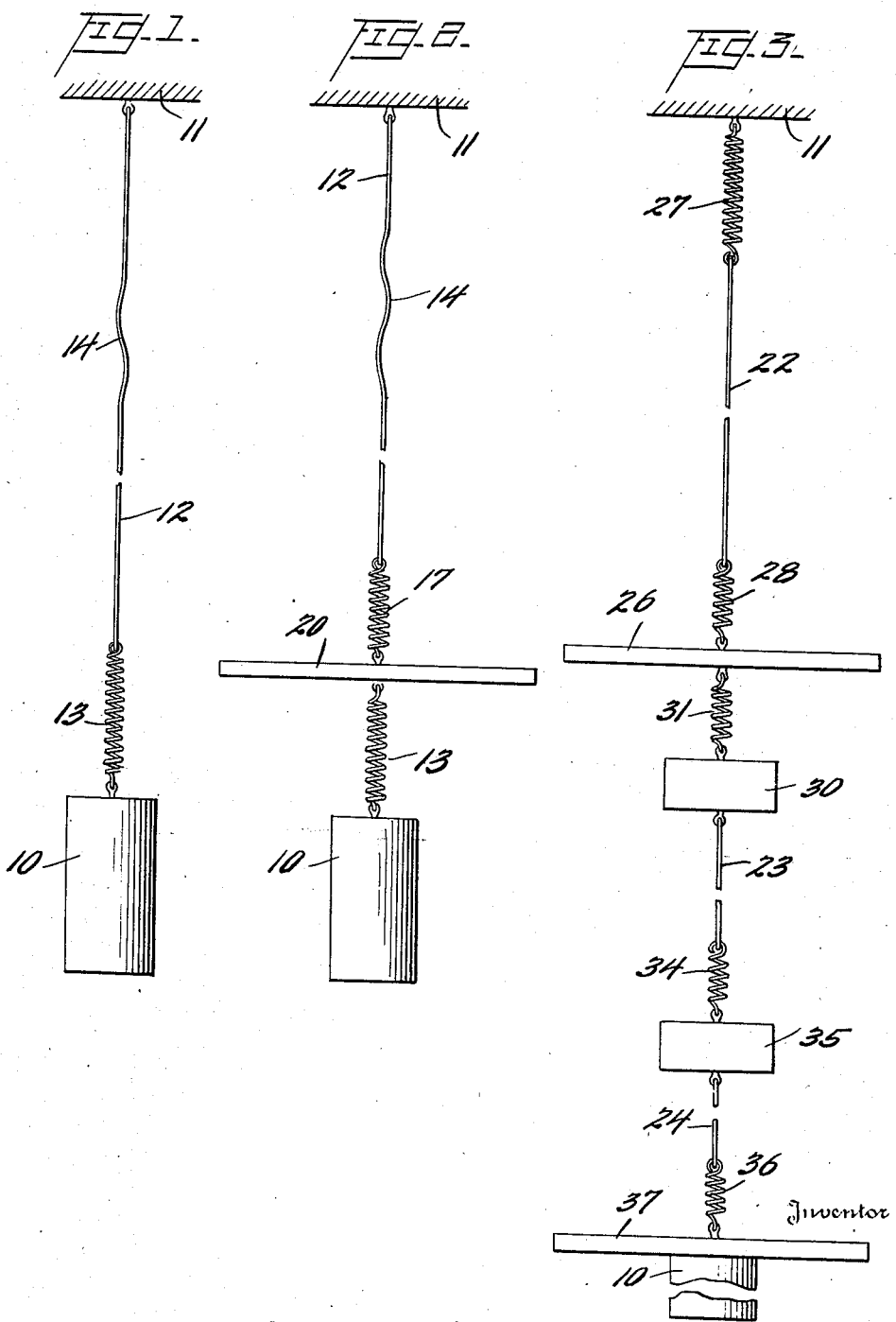
Inventor
Olive S. Petty
By Watson, Cole, Grindle & Watson
Attorney Patented Dec. 30, 1941

2,268,495

UNITED STATES PATENT OFFICE 2,268,495

SUSPENSION SYSTEM

Olive S. Petty, San Antonio, Tex.

Application May 1, 1940, Serial No. 332,808

6 Claims. (Cl. 73—51)

This invention relates to improvements in suspension systems and is more particularly concerned with apparatus for suppressing and dissipating vibrational energy in such systems.

The invention is especially applicable to systems for suspending measuring instruments and the like in fluid or semi-fluid media, such as water, mud, oil, etc. and has for its principal object the prevention of transmission to the suspended instrument of objectionable vibrations induced in the suspension system. For example, it is frequently necessary to record vibrational disturbances and other phenomena below the surface of a body of water, or in the mixture of mud, sand and water ordinarily present in wells during the drilling thereof. In case it is desired to measure vibrational disturbances under such conditions, it is important to reduce to a minimum the transmission of disturbances to the instrument from the cable or other tension means by which the instrument is suspended. In the case of instruments of other types, for example devices for measuring gravitational or magnetic fields, it is desirable to so suspend the instrument that vibrational disturbances imparted thereto from any source, including both the suspension system and the surrounding medium, are minimized or eliminated. It is sought by means of the present invention to accomplish these results with inexpensive and relatively simple devices associated with the suspension system and with the instrument.

Thus, it is a more specific object of the invention to provide, in a suspension system for measuring instruments or the like, a series of devices for retarding the transmission of vibrational disturbances by the suspension system toward the instrument by deflecting the disturbing energy away from the instrument, by dissipating vibrational energy in the form of heat, and by otherwise isolating, so far as is possible, the instrument from the vibrational disturbances induced or arising in the system. The invention contemplates the suppression of vibrational disturbances in a suspension system regardless of the nature or origin thereof; they may be induced by agitation of the system in lowering the instrument or they may be imparted to the system and the instrument as the result of vibrational wave-form energy propagated in the medium in which the instrument and system are immersed.

In a preferred form of the invention, it is proposed to employ three general types of vibrational damping or blocking devices. One of these is the inertia type comprising a member of such substantial weight that displacement thereof as the result of vibrational disturbances is resisted solely by reason of the weight. Another is a yielding or elastic device which is capable of permitting relative displacement between two adjacent sections of the suspension system, the device being designed to reduce materially the amplitude of vibrational disturbances transmitted therethrough. The third may be described as a combined friction damping and reflecting device, serving to dissipate part of the energy of vibration in the form of heat by friction and to deflect or reflect part of the energy away from the suspension system and into the surrounding medium. These devices are preferably so arranged with respect to each other and to the suspended instrument as to minimize the transmission of vibrational disturbances to the instrument from the suspension system.

It is also proposed, as part of the instant invention, to minimize transmission of vibration directly to the instrument from the medium in which the instrument is immersed, where the instrument employed is designed to measure phenomena other than vibrational disturbances in the medium.

Further objects and features of the invention will be apparent from the following description taken in connection with the accompanying drawing, in which Figure 1 is a diagrammatic representation, in elevation, of a suspension system illustrating one method of practicing the invention; and Figures 2 and 3 are similar views illustrating modified forms of suspension systems.

In order to facilitate an understanding of the principles of the invention reference is made herein to several preferred embodiments thereof, and specific language is employed to describe the same. It will nevertheless be understood that no limitation of the scope of the invention is thereby intended, various alterations and modifications of the illustrated structure being contemplated, such as fall within the principles of the invention as outlined herein.

Dealing first with the form of the invention shown in Figure 1, which illustrates a very simple apparatus, it will be observed that an instrument 10 is suspended from a fixed support 11 by a tension element such as a cable 12. Interposed between the instrument 10 and cable 12 is an elastic device 13 in the form of a helical spring. A vibrational disturbance has been set up in the cable and is indicated in an exaggerated manner at 14, this disturbance travelling along the cable. When this disturbance reaches the elastic element, it will cause relative displacement of the several convolutions of the spring and will be largely absorbed and greatly attenuated, especially if the natural frequency of that part of the suspension system represented by the device 13 and instrument 10 is relatively low as compared with the natural frequency of the vibrational disturbances which are propagated in the cable 12, for example by the use of an instrument having a relatively high weight and a spring exerting a relatively low restoring force on deformation.

In Figure 2 is diagrammatically represented a similar but somewhat less simple suspension system, similar to reference characters being employed to designate essential elements functioning in the same manner. In this instance, a friction device 20 is employed, this device being connected to the tension means or suspension cable 12 and to the instrument 10 by yielding devices in the form of springs numbered 17 and 13 respectively. The friction device is so formed as to present abnormally large surfaces to offer marked resistance to displacement thereof with respect to the fluid in which the suspension system and instrument is immersed. For example, the lateral dimensions of the device 20 may be relatively large so as to effect a relatively close mechanical coupling between the device and the fluid. Alternatively, the device may be suitably dimensioned in other directions to resist displacement thereof with respect to the fluid in such direction or directions as the movement incident to vibrational disturbance in the suspension system normally occurs.

When disturbances are induced in or transmitted through the supporting cable, the amplitude of vibration will be materially reduced on passing through the yielding device 17. Such energy as is transmitted through the device 17 to the friction device 20 will impart corresponding movement to the latter, but this movement will be resisted by reason of the high mechanical coupling between this device and the surrounding fluid. A part of the energy delivered to the device 20 will be dissipated in the form of heat, as the result of displacement of the device with respect to the fluid; a part of the energy will be utilized in imparting movement to the surrounding fluid, and thus will be diverted or reflected from the suspension system; and the remaining small part of the energy of vibration of the device 20 will be transmitted through the yielding device or spring 13, which effects further attenuation of energy. The amount of energy reaching the instrument 10 is thus only a very small part of the initial energy of the vibrational disturbance in the cable 12.

It will be appreciated that the friction device 20 may also function as an inertia device, particularly if the mass thereof is relatively high. Furthermore, the transmission of energy to the instrument 10 from the suspension system may be reduced by increasing the mass of the instrument where the instrument is of such a nature that it is not employed for the measurement of vibrational disturbances in the medium in which it is suspended. On the contrary, instruments such as seismometers and the like, which are designed to measure vibrational disturbances, should be constructed so as to afford only a relatively small mass, except for the usual inertia member which is embodied in and forms a part of the instrument, in order that the instrument casing may be readily displaced in response to seismic impulses and the like which cause vibration of the surrounding medium.

Turning now to Figure 3, it will be observed that this figure discloses a suspension system employing a number of different types of devices arranged in series and at spaced intervals along the supporting cable or tension means for the purpose of minimizing the transmission of energy from the suspension system to the instrument 10. Thus the first or upper section 22 of the cable is connected to the support 11 and to a friction device 26 by elastic devices numbered 27 and 28 respectively, whereby the device 26 is in a sense isolated from the cable, and the latter from the support 11, any vibrations occurring either in the support or in the cable being attenuated before being passed on to the device 26. The energy imparted to the device 26 is dissipated in part by friction and in part by deflection to the surrounding medium. The device 26 is connected to an inertia member 30 by means of an elastic device 31, any motion of which the friction device 26 partakes, being thus largely dissipated in the elastic device 31, particularly if the weight of the inertia member 30 is relatively large. The inertia member 30 is connected through a second section 23 of the cable and through a further elastic device 34 to a second inertia member 35, with further attenuation of vibrational energy. The instrument 10 is then suspended from the inertia device 35 by a third section 24 of the cable, an elastic device 36, and a friction device 37, the latter being directly connected to the instrument 10 so that the instrument may partake of the motion of the surrounding medium and may be used to measure such motion, for example when a seismometer or like instrument is employed. Any vibrational energy induced in or imparted to the third section 24 of the cable is attenuated by the yielding device 36, the action of which is aided by the friction device 37, which tends to resist displacement in the surrounding medium and thus facilitate absorption of vibrational disturbance by the yielding device 36. In the employment of the suspension system shown in Figure 3 to support instruments intended for purposes other than the measurement of vibrations, such as magnetic or gravitational instruments, it will be appreciated that the friction device 37 will be omitted and that the weight of the instrument 10 or its casing will be large as compared to the motion resisting area presented to the surrounding medium, whereby the mechanical coupling between the instrument and the surrounding medium is reduced to a minimum.

In a system such as disclosed in Figures 2 and 3, and employing a friction device in association with the suspending cable, it is desirable that the device be located in some point remote from the instrument, in order that vibrational disturbances which are being dissipated in the surrounding medium by the friction device will not be transmitted through the medium to the instrument. In other words, in the arrangement shown in Figure 3, the friction device 26 should be disposed considerably above the instrument 10 so that the larger portion of energy transmitted by the device 26 to the surrounding medium will be dissipated before reaching the instrument.

It will be appreciated that the foregoing examples are merely illustrative and that many modifications and alterations thereof will occur to one skilled in the art to which the invention relates. The order of the various devices, their relation to each other, and their shape, mass, and other characteristics are all of importance in the elimination of undesired vibrational disturbances. In general the suspension system proposed herein functions independently of frequency, behaving in a manner analogous to an electrical filter, but being substantially aperiodic, so as to absorb, dissipate, and reject vibrational disturbances of any frequency or character. It will nevertheless be understood that such a system may, if desired, be so adjusted as to respond to and minimize certain vibrational frequencies only, for example by proper selection of the characteristics of the devices employed thereon. Thus the several subordinate elastic systems constituted by each combination of an elastic device with an inertia member may be selected to provide such natural periods of vibration as to respond primarily to higher frequencies than those which are propagated in the medium in which the suspension system is employed, whereby the lower and desired frequencies may readily be received and measured by a seismometer or similar vibration responsive instrument to the exclusion of undesired frequencies.

The suspension system proposed herein is particularly effective in the measurement of seismic disturbances since it readily discriminates between vibrations occurring at different depths in a medium. Thus by damping and dissipating energy throughout the length of the suspension system, the suspended instrument may be used to record only the energy of vibration of the medium at the depth of the instrument, whereby the instant of arrival of energy at any particular depth may be accurately measured without interference from energy arriving at other depths.

It will be understood that while a cable is referred to herein and is shown in the drawing, various other types of supporting tension device may be employed, for example, pipes, rods, etc. It will further be understood that while the various elements illustrated herein are shown as rectangular in outline, this is merely the result of diagrammatic representation, and is not necessarily significant. Again, the elastic or flexible devices may assume various forms other than that shown, and the term is intended to include devices of the nature of dashpots and the like, which permit but damp relative movement between two displaceable elements, as well as other deformable, energy absorbing means, such as rubber members.

Having thus described the invention, what is claimed as new and desired to be secured by Letters Patent is:

1. In a suspension system for supporting a measuring instrument in a fluid medium, the combination with tension means carried by a fixed support and supporting said instrument, of means interposed in said tension means between said instrument and said support including an elastic device and an inertia member carried thereby, said elastic device being so constructed as to exert upon deformation a restoring force which is relatively low as compared with the weight of said inertia member, whereby vibrational disturbances in said tension means are largely absorbed in said elastic device, and means including a second elastic device connecting said instrument to said tension means to effect further absorption of vibrational energy.

2. In a suspension system for supporting a measuring instrument in a fluid medium, the combination with an elastic device carried by a fixed support, of elongated tension means connecting said elastic device to said instrument to suspend the latter, said tension means including a second elastic device and an inertia member carried thereby.

3. In a suspension system for supporting a measuring instrument in a fluid medium, the combination with an elastic device carried by a fixed support, of elongated tension means connecting said elastic device to said instrument to suspend the latter, said tension means including a second elastic device and an inertia member carried thereby, said inertia member being connected directly with said instrument.

4. In a suspension system for supporting a measuring instrument in a fluid medium, the combination with an elastic device carried by a fixed support, of tension means connecting said elastic device to said instrument to suspend the latter, and means associated with said tension means for damping vibrational disturbances therein, said last named means including a friction member offering marked resistance to displacement in said medium in response to vibrational disturbances in said tension means.

5. In a suspension system for supporting a measuring instrument in a fluid medium, the combination with an elastic device carried by a fixed support, of tension means connecting said elastic device to said instrument to suspend the latter, and means associated with said tension means for damping vibrational disturbances therein, said last named means including a friction member offering marked resistance to displacement in said medium in response to vibrational disturbances in said tension means, said tension means including a second elastic device disposed adjacent said instrument and directly supporting the latter.

6. In a suspension system for supporting a measuring instrument in a fluid medium, the combination with tension means carried by a fixed support and connected with said instrument, said tension means including a resilient tension device, of friction damping means carried with said instrument, said friction means offering marked resistance to displacement in said medium in response to vibrational disturbances in said tension means.

OLIVE S. PETTY.